Sept 10, 1957     H. L. BIRD, JR., ET AL     2,806,024
ERYTHROMYCIN B AND PROCESS FOR PRODUCTION THEREOF Filed July 29, 1953     2 Sheets-Sheet 1

INFRARED ABSORPTION SPECTRA OF ERYTHROMYCIN AND ERYTHROMYCIN B

INVENTORS
HAROLD L. BIRD Jr.
WILLIAM MAX STARK
FREDERICK R. VAN ABEELE
BY
Frank A. Steldt
ATTORNEYS Sept 10, 1957   H. L. BIRD, JR., ET AL   2,806,024
ERYTHROMYCIN B AND PROCESS FOR PRODUCTION THEREOF
Filed July 29, 1953   2 Sheets-Sheet 2

SOLVENT: 1% AQUEOUS AMMONIA SATURATED
WITH METHYL ISOBUTYL KETONE

INVENTORS
HAROLD L. BIRD Jr.
WILLIAM MAX STARK
FREDERICK R. VAN ABEELE
BY
Frank A. Steldt
ATTORNEYS

United States Patent Office 2,806,024
Patented Sept. 10, 1957

2,806,024

ERYTHROMYCIN B AND PROCESS FOR PRODUCTION THEREOF

Harold L. Bird, Jr., William Max Stark, and Frederick R. Van Abeele, Indianapolis, Ind., assignors to Eli Lilly and Company, Indianapolis, Ind., a corporation of Indiana Application July 29, 1953, Serial No. 371,044

5 Claims. (Cl. 260—210)

This invention relates to novel antibiotic substances and more particularly to erythromycin B and its acid addition salts, and to the preparation thereof.

Erythromycin is an antibiotic substance having a broad antibacterial spectrum which has been found to be an effective therapeutic agent for the treatment of diseases caused by microorganisms, and which is produced by the culture of the microorganism *Streptomyces erythreus* upon artificial nutrient culture media. The microorganism, suitable culture media and fermentation processes useful for the production of erythromycin have been described in detail in copending application Serial No. 282,246 of Robert L. Bunch and James M. McGuire, now U. S. Patent No. 2,653,899.

We have discovered a new antibiotic agent which can be produced together with erythromycin by culturing *Streptomyces erythreus* upon artificial nutrient media. We have named the new antibiotic agent which we have discovered erythromycin B, and that term will be employed for purposes of identification throughout this specification.

Figure 1:
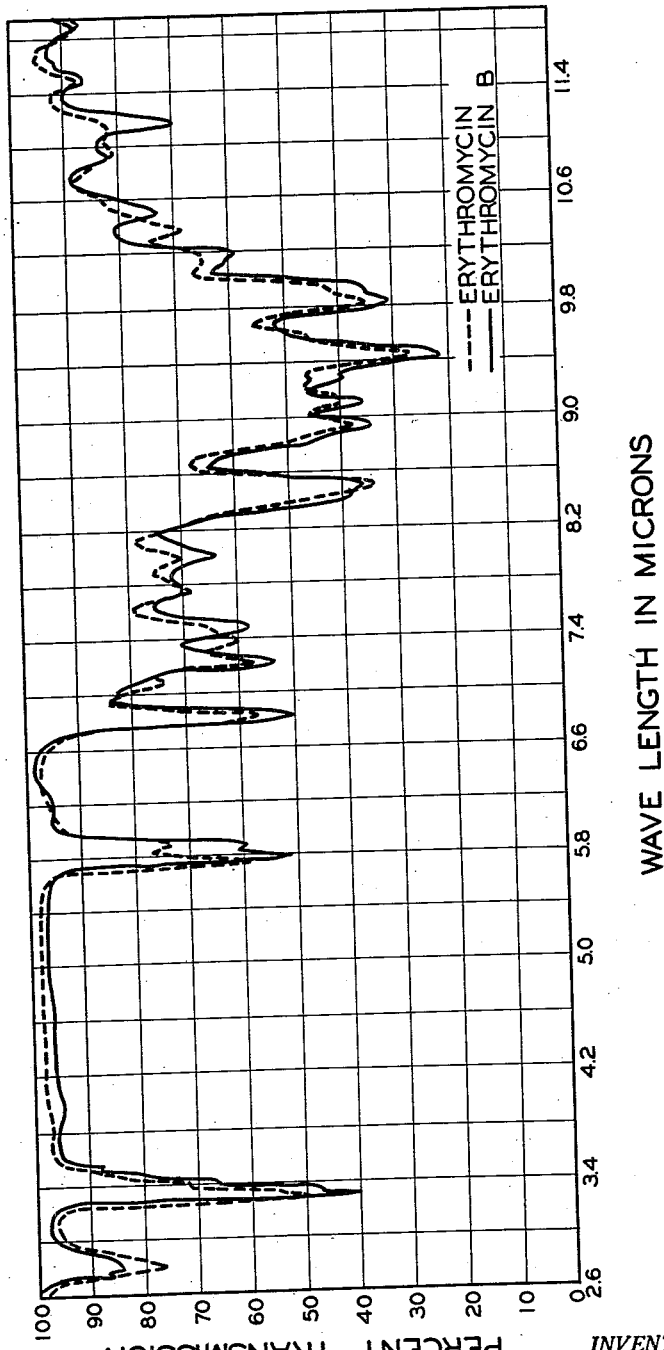

Erythromycin B has some similarity in properties to erythromycin, but is characterized by certain distinct differences in chemical structure which are most readily shown by comparison of the infrared absorption spectra of erythromycin and erythromycin B. In the accompanying drawings, Fig. 1 illustrates the comparative infrared absorption spectra of chloroform solutions of erythromycin and erythromycin B. Additionally, erythromycin B is distinguished by a greater stability in strongly acid solutions.

Erythromycin B is obtained in a manner similar to that of obtaining erythromycin, by growing the microorganism *Streptomyces erythreus* upon culture media containing assimilable sources of carbohydrate, nitrogen, and inorganic salts, to produce a broth which contains the antibiotic agent erythromycin B together with erythromycin. The broth is filtered to remove the mycelium, and the mixture of antibiotic agents i. e. erythromycin B and erythromycin, are separated therefrom by extraction with a non-polar water-immiscible solvent. The erythromycin B in the mixture is separated from the erythromycin by processes which utilize differential solubility, as for example, adsorption followed by selective elution, or by countercurrent solvent extraction in multi-tube extraction apparatus using immiscible solvents.

The actinomycete employed in the fermentative processes of this invention belongs to the genus Streptomyces of the order Actinomycetales, according to the classification in Bergey's Manual of Determinative Bacteriology (6th edition) page 938. In its morphological characteritsics the organism appears to be closely related to an actinomycete described by Waksman as Actinomyces 161 [Soil Science 8, 71–214 (1919)] and later identified by him as *Streptomyces erythreus*. There are certain differences in the cultural properties of the organism described by Waksman and those of the novel isolate of this invention, and the isolate of this invention has been provisionally classed as a strain of *Streptomyces erythreus*. A culture of the organism deposited in the culture collection of the Northern Regional Research Laboratory has been assigned the culture number NRRL 2338.

This invention will be described with particular reference to the above-mentioned strain of the organism, but it is to be understood that the fermentative processes of this invention not only embrace the use of *Streptomyces erythreus*, strain NRRL 2338, but also other erythromycin-B-producing strains of *Streptomyces erythreus*, such strains being readily produced and isolated by routinely applied isolation and strain-modification methods which include selection of cultured organisms, and exposure of organisms to modifying means such as X-ray, ultraviolet light, and chemical agents, for example, the nitrogen mustards. Illustrative examples of other erythromycin-B-producing strains are *Streptomyces erythreus*, strains NRRL 2359, 2360 and 2361.

As noted above, *Streptomyces erythreus* strain NRRL 2338 can be grown in a culture medium to produce effective antibiotic agents. The culture medium can be any one of a number of media since, as is apparent from the above-described utilization tests, the organism is capable of utilizing many energy sources. However, for economy of production, maximum yield of antibiotic, and ease of isolation of the antibiotics, certain culture media are preferable. Thus for example, the presently preferred sources of carbohydrate in the culture medium are starch and glucose. Other sources which may be included are sucrose, dextrin, molasses, and the like. The preferred nitrogen sources are corn steep, soybean meal or flour, and distillers' solubles, but other sources which are utilizable include casein, amino acid mixtures, peptones (both meat and soy), and the like. Inorganic nitrogen sources such as nitrate salts or ammonium salts can also be employed.

The nutrient inorganic salts to be incorporated in the medium include the customary salts capable of yielding ions of sodium, potassium, calcium, phosphate, chloride, sulfate and the like.

As is necessary for the growth and development of other microorganisms, essential trace elements should also be included in the culture medium for growing the actinomycete employed in this invention. Such trace elements are commonly supplied as impurities incidental to the addition of the other constituents of the medium.

For maximum growth and development of *Streptomyces erythreus*, strain NRRL 2338, the culture medium prior to inoculation with the organism should be adjusted to between pH 6.0 and pH 7.5, and preferably is adjusted to about pH 6.5. It has been observed that during the growth period of the organism and the production of antibiotics, the medium gradually becomes alkaline and may attain an alkalinity from about pH 7.2 to about pH 8.5 or above, the final pH being dependent at least in part on the initial pH of the medium, the buffers present in the medium, and the period of time for which the organism is permitted to grow.

As is preferred for the production of other antibiotics in massive amounts, submerged, aerobic cultural conditions are the conditions of choice for the production of large amounts of erythromycin B. For preparation of limited amounts of these substances, shake flask and surface culture in bottles can be employed. Furthermore, as is well known, when growth is carried out in large tanks it is preferable to use the vegetative form of the organism for inoculation of the production tanks to avoid a pronounced lag in the production of the antibiotic and the attendant inefficient utilization of the equipment. Accordingly it is desirable first to produce a vegetative inoculum of the organism by inoculating a relatively small quantity of culture medium with the spore form of the organism, and when a young, active vegetative inoculum has been secured, to transfer the vegetative inoculum aseptically to the large tanks. The medium in which the vegetative inoculum is produced can be the same or different medium as that utilized for the production of the antibiotic.

*Streptomyces erythreus*, strain NRRL 2338, can be grown well at temperatures between about 25° C. and about 37° C. Optimal antibiotic production appears to occur with the culture medium maintained at about 26–30° C.

As is customary in producing antibiotics by submerged culture processes, sterile air is blown through the culture medium. For efficient growth of the organism and antibiotic production the volume of air employed in the tank production of erythromycin and erythromycin B preferably is upwards of 0.1 volume of air per minute per volume of culture medium. More efficient growth and antibiotic production are secured when the volume of air used is at least .4 volume of air per minute per volume of culture broth.

The rate of production of the antibiotic agents and the concentration of the antibiotic activity in the culture medium can readily be followed during the growth period of the microorganism by testing samples of the culture medium for their antibiotic activity against organisms known to be susceptible to the antibiotic, for example, *Staphylococcus aureus* and *Mycobacterium tuberculosis*. For such determinations, it is convenient to employ a test which comprises making serial dilutions of the culture samples, adding portions of the diluted samples to melted nutrient agar, solidifying the agar in a petri dish, inoculating the plate with a young culture of *S. aureus* or *M. tuberculosis*, and determining the greatest dilution of the culture medium which causes complete inhibition of the growth of organism on the nutrient agar.

The production of the antibiotic agents can also be followed by turbidimetric test procedures such as are commonly employed in connection with the production of other antibiotics.

The presence of erythromycin B and erythromycin can be determined by chromatographic procedures. A suitable method of operation comprises dissolving about 0.2 to 0.5 mcg. of the material to be tested in a small amount of a solvent such as alcohol, placing the concentrated solution as a spot on one end of a strip of filter paper, drying, and developing according to the usual paper strip, descending chromatographic technique.

Among the solvents which can be used for development of the strip are 1:99 (v./v.) concentrated ammonium hydroxide solution; distilled water saturated with methyl isobutyl ketone; distilled water saturated with methyl isobutyl ketone, to which 2 percent (v./v.) of piperidine has been added; pH 9.9 0.1 M borate buffer, saturated with methyl isobutyl ketone; 0.15 M sodium hydroxide saturated with methyl isobutyl ketone; 0.1 M potassium acid phosphate buffer solution containing 3 percent by volume of ethanol; and the like. Development is continued for about 4 to 5 hours, or until the solvent front approaches the end of the strip. After development, the location of antibiotic material upon the strip is determined by means of a bioautograph. In carrying out this procedure the developed filter paper strip is placed upon the surface of a nutrient agar culture medium about ⅛ inch thick in a large glass tray, which medium is prepared by seeding warm sterile nutrient agar with *Bacillus subtilis*. The antibiotic diffuses from the paper into the agar. After 10 minutes the paper strip is removed, the tray is inverted and the position of the filter paper strip, the solvent front and the point of application of the test solution are marked directly upon the outside bottom of the glass tray. The agar medium is incubated overnight at about 37° C. in inverted position. The occurrence of clear zones, i. e. areas of no bacterial growth, in the medium indicates the location of the antibiotic agent as it occurred on the filter paper. By measuring the distance travelled by the antibiotic and the solvent, respectively, the $R_f$ value, or ratio of the rate of movement of the antibiotic to that of the solvent, is determined. It has been found that erythromycin B moves less rapidly than erythromycin in this test. If a mixture of erythromycin B and erythromycin is present, two clear zones appear in the bioautograph; if but one area of no growth appears, comparison of the position of that zone with the position of a zone obtained with pure erythromycin B or erythromycin will establish which antibiotic agent is present. Under optimum conditions, the $R_f$ value of erythromycin B is about three-fourths of the $R_f$ value of erythromycin.

Figure 2:
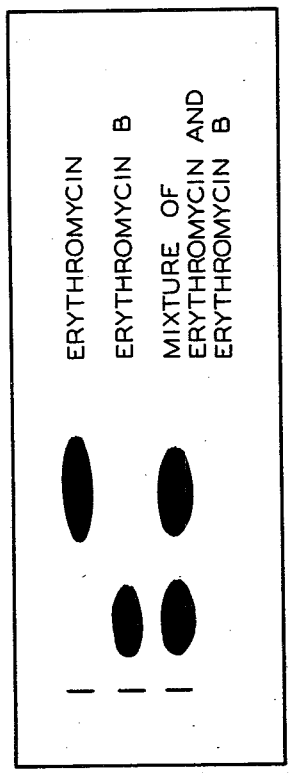

In the drawings, Fig. 2 represents a bioautograph prepared from a paper chromatogram on which were simultaneously chromatographed erythromycin B, erythromycin, and a mixture of erythromycin and erythromycin B in approximately equal amounts. The solvent used for development was 1 percent aqueous solution of concentrated ammonium hydroxide saturated with methyl isobutyl ketone. The areas indicated in black are zones where no bacterial growth occurred.

In general, maximum production of total antibiotic activity after inoculation of the culture medium occurs within about two to five days when submerged aerobic culture is employed, and within about 5 to 10 days when surface or shake flask culture is used.

Usually approximately equal amounts of erythromycin and erythromycin B are produced in the culture media, but this ratio can vary depending on the duration of incubation. In general, shorter incubation such as one or two days favors the production of a greater proportion of erythromycin B. Prolongation of the incubation results in a decrease in the proportion of erythromycin B as compared with erythromycin, and may even result in an actual decrease in the total amount of erythromycin B present in the culture broth. The reason for this decrease in proportion or absolute decrease is not understood.

The antibiotic agents produced by culture of *S. erythreus* strain NRRL 2338 can be recovered from the culture medium by extractive or adsorptive techniques. The former are preferred for commercial production inasmuch as they are less time-consuming and expensive. For the extraction of the antibiotic compounds from the culture medium, water-immiscible, polar organic solvents are preferred, such including alkyl esters of fatty acids, for example, ethyl acetate and amyl acetate; chlorinated hydrocarbons, for example, chloroform and ethylene dichloride; alcohols having slight water-solubility, for example, butanol and amyl alcohol; ketones of slight water-solubility, for example, methyl amyl ketone; and others, for example, ethyl ether, and dibutyl ether. Other solvents of similar character can also be employed. Preferably, the filtered culture broth is adjusted to about pH 9.5 or higher before extraction.

The separation of erythromycin B from erythromycin can be accomplished by utilizing differences in the solubility and the adsorptive characteristics of the two compounds. For example, erythromycin B is more strongly adsorbed on cellulose than is erythromycin. Thus, when a mixture of erythromycin and erythromycin B is adsorbed from solution on a column of cellulose, and the column is eluted with a suitable solvent, erythromycin appears in the initial eluates and erythromycin B remains upon the column and is recovered by continued elution. Alternatively the two compounds can be separated, with recovery of erythromycin B, by selective extraction processes using a counter-current extraction apparatus.

The following examples illustrate the isolation and properties of erythromycin B:

Example 1

A sporulated culture of *Streptomyces erythreus*, strain NRRL 2338 is produced by growing the organism on a nutrient agar slant having the following composition:

| | | |
|---|---|---|
| Dextrin | g | 15 |
| Tryptone | g | 5 |
| Agar | g | 20 |
| Betaine | g | 0.5 |
| Mineral mixture [1] | ml | 2 |
| Water, q. s. to make | l | 1 |

[1] The mineral mixture consists of the following ingredients:

| | | |
|---|---|---|
| $K_2HPO_4$ | g | 100.0 |
| NaCl | g | 100.0 |
| $MgSO_4$ | g | 100 |
| $FeSO_4.7H_2O$ | g | 2.0 |
| $ZnSO_4.7H_2O$ | g | 1.0 |
| $CuSO_4.5H_2O$ | g | 0.5 |
| $MnCl_2.4H_2O$ | g | 0.5 |
| $CoCl_2.6H_2O$ | g | 0.1 |
| $CaCl_2$ | g | 40.0 |
| Water, q. s. to make | l | 1 |

The slant is incubated for ten days at 33° C. The spores are recovered as a water suspension by layering the slant with a small amount of sterile distilled water and gently scraping the spores from the slant surface.

About 1 ml. of the spore-suspension thus obtained is used for inoculating under sterile conditions the following sterilized culture medium:

| | | |
|---|---|---|
| Casein digest (N–Z amine A, obtained from Sheffield farms) | g | 1 |
| Blackstrap molasses | g | 2 |
| $K_2HPO_4$ | g | 0.15 |
| Water | ml | 100 |

The inoculated culture medium is incubated at about 28° C. for about seventy-two hours until good vegetative development is observed. About 5 ml. of the culture medium containing the vegetative growth is used to inoculate a 250 ml. Erlenmeyer flask, containing about 75 ml. of a sterilized fermentation culture medium having the following composition:

| | | |
|---|---|---|
| Sucrose | g | 45.0 |
| Soybean meal | g | 20 |
| Condensed molasses distillers' solubles | g | 2 |
| Sodium chloride | g | 5 |
| Calcium carbonate | g | 2 |
| Cobaltous chloride hexahydrate | g | 0.001 |
| Water, q. s. to make | l | 1 |

The flask containing the inoculated culture medium is placed in an incubator room maintained at a temperature of about 28° C. and shaken for about six days on a rotary shaker having a two-inch stroke, and run at a rate of 240 revolutions per minute. From time to time samples of the culture medium are tested for the total amount of the antibiotic activity contained therein. When the amount of antibiotic acitvity attains a value of about 250–300 mg./ml. of broth, the broth in the shake flask is filtered to remove the mycelium.

About 1½ l. of filtered culture broth are adjusted to pH 9.5 using sodium hydroxide, and extracted with 0.75 l. of amyl acetate. The amyl acetate extract, containing substantially all of the antibiotic activity present in the original broth, is concentrated by evaporation in vacuo to a volume of about 10 ml. To the concentrated amyl acetate solution is added 0.5 g. of purified cellulose fiber, and the mixture is dried overnight in vacuo. The dried, finely powdered cellulose, containing absorbed thereon the total antibiotic activity of the broth, is placed on the upper surface of a chromatographic adsorption column measuring about 1.25 x 15 inches and containing about 161 g. of dry purified cellulose fiber (available commercially as "Solka floc"). The column is developed using 0.1 percent aqueous ammonium hydroxide saturated with methyl isobutyl ketone. The eluate is collected in fractions, which are assayed for antibiotic activity using *S. aureus* as a test organism. The presence of erythromycin and/or erythromycin B is determined by chromatographic analysis on filter paper using the same solvent system described hereinabove. It is found that the first 120 ml. portion of eluate contains only erythromycin, whereas the second 120 ml. portion contains a mixture of erythromycin and erythromycin B. Subsequent active fractions of eluate contain only erythromycin B, and these fractions are combined and extracted with chloroform. The chloroform extract is evaporated to dryness in vacuo and the residue, consisting of erythromycin B, is washed with a small quantity of hexane and dissolved in 25 ml. of ether. The ether solution is filtered and evaporated to dryness in vacuo. The residue is dissolved in the minimum amount of warm acetone and cooled whereupon crystals of erythromycin B are obtained. As is the case with erythromycin, the crystalline salt contains an amount of solvent of crystallization. Subjection of the crystalline salt to solvent-removing conditions results in the loss of the solvent and the crystalline properties of the antibiotic.

Example 2

A sterilized culture medium is prepared containing the following ingredients:

| | | |
|---|---|---|
| Dextrose | g | 15 |
| Soybean meal | g | 15 |
| Cornsteep solids | g | 5.0 |
| Sodium chloride | g | 5.0 |
| Calcium carbonate | g | 2.0 |
| Water, q. s. to make | l | 1 |

The culture medium is inoculated with a spore suspension obtained by growing *Streptomyces erythreus* strain NRRL 2338 upon a nutrient agar slant according to the procedure of Example 1, and removing the spores with a small amount of sterile distilled water. The inoculated culture medium contained in a 2 l. flask is incubated at about 28° C. for about thirty-six hours, while shaking the flask in a reciprocal shaker having a two-inch stroke and working at the rate of 114 complete excursions per minute. The vegetative mycelial growth which results is removed by centrifugation, washed with water and resuspended in about 1 l. of sterile distilled water. The inoculum thus prepared is used to inoculate a 40 l. fermenter containing about 20 l. of a sterilized fermentation broth having the following composition:

| | | |
|---|---|---|
| Glycine | g | 150 |
| Sucrose | g | 1370 |
| dl-α-alanine | g | 17.8 |
| Sodium dihydrogen phosphate | g | 100 |
| Sodium chloride | g | 100 |
| Magnesium sulfate | g | 10 |
| Ferrous sulfate heptahydrate | g | 0.4 |
| Zinc sulfate heptahydrate | g | 0.2 |
| Magnesium chloride tetrahydrate | g | 0.032 |
| Cobaltous chloride hexahydrate | g | 0.2 |
| Water, q. s. to make | l | 20 |

The mixture of inorganic salts, glycine and dl-α-alanine are sterilized together and the pH of the broth adjusted to approximately 7.5 after sterilization. The sucrose is sterilized separately and added aseptically to the sterilized broth.

The sterilized broth is cooled and the vegetative inoculum prepared as noted above is aseptically added thereto. The organism is grown in the broth for about four days at a temperature of about 28° C. During the growth period the broth is stirred and sterile air is blown through the broth at the rate of about 0.5 volume of air per volume of broth per minute. Microbiological tests, using S. aureus as a test organism, indicate the total antibiotic activity of the broth to be about 250 mcg./ml., about 50 percent of which is shown by paper chromatography and bioautograph to be erythromycin B. The broth is filtered to remove the mycelium and the clear broth is suitable for the recovery of erythromycin B therefrom.

1½ l. of a filtered culture broth containing erythromycin and erythromycin B, and prepared according to the procedure set forth above, are adjusted to pH 9.5 using aqueous sodium hydroxide and extracted with about 0.75 l. of amyl acetate. The amyl acetate extract is evaporated to dryness in vacuo. The residue from evaporation is dissolved in about 250 ml. of chloroform, filtered, and evaporated to dryness in vacuo. A solvent system is prepared by mixing 20 parts of methylisobutyl ketone, 20 parts of 0.1 M phosphate buffer having pH 6.5 and 1 part of acetone. On standing, a two-layer system forms and is placed in an all-glass 200 ml. 60-tube Craig countercurrent extraction apparatus. The residue for evaporation of the chloroform extract is dissolved in 10 ml. of the upper phase and added to the initial tube of the extraction apparatus. The countercurrent extraction is then carried out in the usual manner. The fractions are analyzed by microbiological assay using S. aureus as a test organism, and paper chromatography. It is found that fractions numbered 27 to 40 contain only erythromycin B. The fractions are combined and evaporated in vacuo to a volume of 130 ml. The solution is made up to 10 percent sodium chloride, adjusted to pH 9.8 using dilute sodium hydroxide, and extracted with two 75 ml. portions of chloroform. The combined chloroform extracts are dried over anhydrous sodium sulfate and evaporated to dryness in vacuo. The residue from evaporation is dissolved in a minimum amount of acetone at 47° C. and allowed to cool slowly whereupon crystalline erythromycin B is obtained.

The erythromycin B thus prepared melted at 190–191° C. on a Köfler block. Elementary analysis of a sample dried at 60° C. in vacuo for three hours over phosphorus pentoxide gave the following values: 61.54 percent of carbon; 9.45 percent of hydrogen; 2.00 percent of nitrogen; and 27.01 percent of oxygen (by difference).

Electrometric titration in 66 percent aqueous dimethylformamide solution indicated the presence of one titratable group of pK'α equal to 8.5.

The molecular weight as determined from the titration data appears to be about 736.

The ultraviolet absorption spectrum of erythromycin B dissolved in absolute methanol indicated a maximum at 286 mμ, a minimum at 259 mμ and $E_{286}=59$.

Microbiological assay, using S. aureus as a test organism, shows that one milligram of erythromycin B has antibiotic activity equivalent to about 750 micrograms of erythromycin.

The infrared absorption spectrum of a 6 percent solution of erythromycin B in chloroform on a weight-volume basis had distinguishable absorption maxima between 2.4μ and 12μ as follows: 2.80; 3.34; 5.80; 5.90; 6.84; 7.24; 7.50; 7.79; 8.04; 8.54; 8.98; 9.14; 9.48; 9.86; 10.24; 10.56; 10.96; 11.22; 11.54; and 11.94. The infrared absorption curve is shown by the solid line in Fig. 1 of the accompanying drawings.

When samples of erythromycin B and erythromycin are chromatogrammed simultaneously on filter paper strips, using ammoniated distilled water saturated with methyl isobutyl ketone as the developing solvent, the ratio of the rates at which the two antibiotics move is:

$$\frac{Rf \text{ erythromycin } B}{Rf \text{ erythromycin}}=0.75$$

Erythromycin B is much more stable in acid solution than erythromycin. When aqueous solutions containing 38 units per cc. of erythromycin B and erythromycin, respectively, and adjusted to various pH levels, were allowed to stand for one hour at about 25° C., erythromycin B showed a much greater acid stability.

The acid addition salts of erythromycin B are obtained by treating an aqueous solution of erythromycin B base with an equivalent of an acid, and evaporating the solution to dryness in vacuo. Alternatively, an organic solvent solution of the erythromycin B base can be treated with the acid or a solution thereof, and the erythromycin salt precipitated directly from the solution. When acid addition salts of strong acids are being prepared, care should be taken during the addition of the acid to the antibiotic to avoid local high concentrations of the acid, since some of the erythromycin B may be decomposed if the pH falls below about pH 2 for an appreciable length of time. Illustrative examples of salts are the hydrochloride, sulfate, citrate, mandelate, succinate, oleate, palmitate, myristate, stearate, oxalate, thiocyanate and glucoheptonate salts of erythromycin B. Other similar salts can readily be prepared by the above-mentioned procedures. For therapeutic purposes the salts chosen should obviously be the relatively nontoxic salts. Illustratively, the hydrochloride salt of erythromycin B is obtained by treating an ethanol solution of the antibiotic base with an equivalent amount of aqueous hydrochloric acid, and evaporating the solution to dryness in vacuo to obtain the solid salt. The salt is purified by recrystallization from a mixture of ethanol and acetone.

Erythromycin B and its salts are effective antibiotic agents, possessing substantially the same broad antibacterial spectrum as does erythromycin B, taking into account the increased molecular weight of the salts.

We claim:

1. An antibiotic substance of the group consisting of a nitrogenous base and the addition salts thereof, said base being relatively stable with respect to acid and having the following properties: melting point, about 190–191° C.; approximate percentage composition based on elementary analysis, carbon=61.54 percent, hydrogen=9.45 percent, nitrogen=2.00 percent and oxygen (by difference)=27.01 percent; pK'α, about 8.5 determined by titration in 2:1 dimethylformamide water solution; a molecular weight of about 736 obtained from titration data; an ultraviolet absorption maximum at 286 mμ and an ultraviolet absorption minimum, in absolute methanol solution, at 259 mμ; and, in chloroform solution of about 6.0 percent concentration weight-volume, the following distinguishable absorption maxima in an infrared absorption spectrum over the range of 2.4μ to 12.0μ: 2.80, 3.34, 5.80, 5.90, 6.84, 7.24, 7.50, 7.79, 8.04, 8.54, 8.98, 9.13, 9.48, 9.86, 10.24, 10.56, 10.96, 11.22, 11.54 and 11.94μ.

2. The hydrochloride salt of the base according to claim 1.

3. The nitrogenous base according to claim 1.

4. The method of producing erythromycin B which comprises cultivating an erythromycin B-producing strain of Streptomyces erythreus chosen from the group consisting of strains NRRL 2338, NRRL 2359, NRRL 2360 and NRRL 2361 in a culture medium containing assimilable sources of carbohydrate, nitrogen and inorganic salts, under submerged aerobic conditions until substantial antibiotic activity is produced by said organism in the said culture medium, removing the mycelium from the culture medium, adjusting the pH of the mycelium-free medium to about pH 9.5, extracting the total antibiotic activity from the medium with a water-immiscible polar solvent, removing the solvent and separating the erythromycin B from any erythromycin present by differential solubility.

5. The method according to claim 4, in which the Streptomyces erythreus strain is Streptomyces erythreus NRRL 2338.

References Cited in the file of this patent

UNITED STATES PATENTS

| 2,540,284 | Peck | Feb. 6, 1951 |
| 2,649,401 | Haines | Aug. 18, 1953 |
| 2,653,899 | Bunch et al. | Sept. 29, 1953 |

OTHER REFERENCES

Craig et al.: J. Biol. Chem., 665–686, vol. 168, 1947.

Leach et al.: J. A. C. S., June 1951, vol. 73, pages 2794–2800.